Dec. 26, 1967  F. G. F. BEHLES  3,360,068
WHEEL SUSPENSION
Filed April 9, 1965

INVENTOR
FRANZ G. F. BEHLES

BY Dicke & Craig

ATTORNEYS

United States Patent Office 3,360,068
Patented Dec. 26, 1967

3,360,068
WHEEL SUSPENSION
Franz G. F. Behles, Ingolstadt, Germany, assignor to Daimler-Benz Aktiengesellschaft, Stuttgart-Unterturkheim, Germany
Filed Apr. 9, 1965, Ser. No. 446,868
Claims priority, application Germany, Apr. 15, 1964, D 44,152
14 Claims. (Cl. 180—73)

ABSTRACT OF THE DISCLOSURE

The present disclosure relates to a wheel suspension for the driven wheels of motor vehicles by means of inclined guide members whose bearing axes are directed obliquely from the outside toward the vertical vehicle transverse plane containing the wheel centers. The driven axle is split into two half axles, one of which is substantially rigid with its respective inclined guide member and the differential gear unit. The differential gear unit being resiliently mounted with respect to the superstructure by means of a longitudinally extending bar and a transversely extending bar, one of which is in turn mounted by a vertically extending suspension member having resilient joints at its opposite ends so that the axis of the one inclined guide member frame pivoting intersects the axis of the differential frame pivoting axis at substantially the vertical plane passing through the wheel centers.

---

With prior art wheel suspensions of this type, the drive of the wheels takes place either by double-jointed shafts which connect the axle gear housing arranged at the vehicle superstructure with the wheels, or by drive shafts effective as swinging half-axles whose bearings on the sides near the wheels are connected with the inclined guide members for purposes of absorption of differences in movement by longitudinal joints under the interposition of rubber elements. However, with all of these prior art constructions, a relatively large number of joints is required.

The aim of the present invention is, above all, a simplification of the construction by a saving in joints and essentially consists in that one of the two wheels is arranged on a swinging half-axle including the associated axle drive shaft which is connected in an angle-rigid or in a substantially angle-rigid manner with the associated inclined guide member and whose pivot axis intersects the bearing axis of the associated inclined guide member in or near the vertical vehicle transverse plane containing the wheel centers, and in that the opposite wheel supported on the other inclined guide member is driven by a joint-shaft. It is thereby possible to eliminate a joint between the swinging half-axle and the inclined guide member in that—as viewed in the longitudinal direction of the vehicle—the wheel center pivots or swings with respect to the bearing axis of the inclined guide member as well as also with respect to the pivot axis of the swinging half-axle in the same or approximately the same manner about the point of intersection of the two pivot axes.

Preferably, the inclined guide members are so arranged that the bearing axes thereof intersect the vertical vehicle transverse plane containing the wheel centers on the vehicle side opposite the associated wheel whereas the pivot axis of the swinging half-axle supported at the vehicle superstructure extends preferably also obliquely to the vehicle longitudinal direction, and more particularly from in front toward the rear obliquely outwardly from the vertical vehicle longitudinal plane. It is thereby possible to make relatively small, with a relatively great length of the swinging half-axles, the angle between the pivot axis of the swinging half-axle and the bearing axis of the co-ordinated inclined guide member.

For the absorption of the differences in movements, which occur as a result of the different location of the bearing axis of the inclined guide member and the pivot axis of the swinging half-axle, the swinging half-axle according to a further feature of the present invention is elastically suspended at the vehicle superstructure. With an angle-rigid or nearly angle-rigid connection with the associated inclined guide member, the swinging half-axle is thereby able to follow the movements thereof to the necessary extent. Possibly the inclined guide members may also be elastically supported.

The present invention is of importance above all for those constructions in which the swinging half-axle supported at the vehicle superstructure includes the axle gear housing. For the elastic support at the vehicle superstructure, the swinging half-axle or the axle gear housing may be supported at the vehicle superstructure by means of a longitudinally directed and of a transversely directed arm possibly by the interposition of an approximately vertical guide member. The wheel disposed opposite the swinging half-axle may be suspended at the vehicle superstructure exclusively by means of the inclined guide member in that it receives its drive from the axle gear housing preferably by a double-joint shaft.

Accordingly, it is an object of the present invention to provide a wheel suspension of the type described above which simplifies the overall construction thereof.

Another object of the present invention resides in the provision of a wheel suspension, especially for the driven wheels of a motor vehicle in which the number of joints necessary is substantially reduced, thereby also reducing the cost of manufacture and installation.

A further object of the present invention resides in the provision of a wheel suspension for motor vehicles in which swinging half-axles are used in association with inclined guide members which are so constructed and arranged that one of the swinging half-axles can be formed rigid with the axle gear housing and the associated inclined guide member without adversely affecting the kinematics of the suspension.

These and further objects, features, and advantages of the present invention will become more obvious from the following description when taken in connection with the accompanying drawing which shows, for purposes of illustration only, one embodiment in accordance with the present invention, and wherein FIGURE 1 is a plan view of a wheel suspension in accordance with the present invention;

Figure 1:
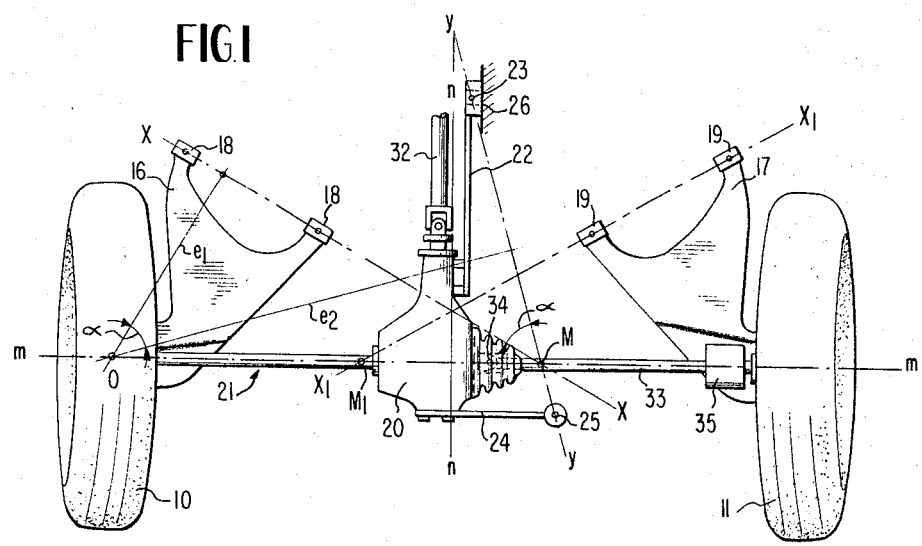
Figure 2:
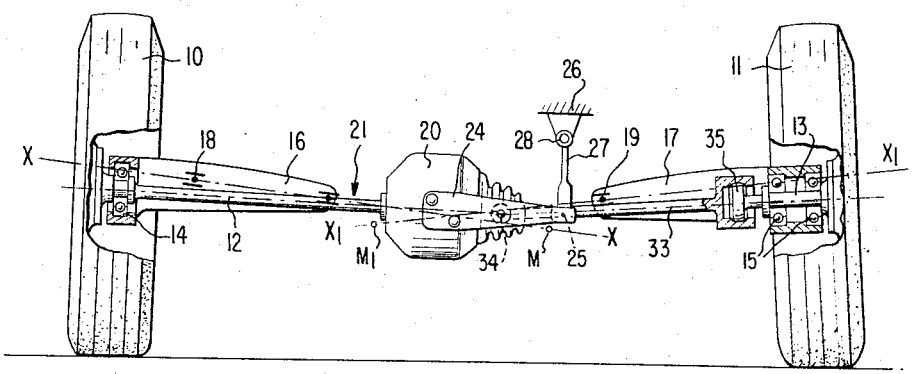
FIGURE 2 is a rear elevational view of the wheel suspension of FIGURE 1.

Referring now to the drawing wherein like reference numerals are used throughout the various views to designate like parts, reference numerals 10 and 11 designate the wheels which are supported on the inclined guide members 16 and 17 by means of their drive shafts 12 and 13 and the ball bearings 14 and 15 (FIG. 2). The inclined guide members 16 and 17 are each constructed in a fork-like manner (FIG. 2) and are supported at the vehicle superstructure in bearing joints 18 and 19 in such a manner that they are able to swing or pivot about the axes $x$—$x$ and $x_1$—$x_1$, respectively, which, as shown in FIGURES 1 and 2, extend, on the one hand, obliquely to the longitudinal axis of the vehicle, and on the other, at an inclination to the horizontal, and more particularly in such a manner that they intersect the vertical vehicle transverse plane $m$—$m$ containing the wheel centers in a point M and $M_1$, respectively, whereby the point M for the left vehicle wheel 10 lies on the right vehicle side and the point $M_1$ for the right vehicle wheel 11 on the left vehicle side, and more particularly, at the height of the wheel center axes or also more or less displaced with respect thereto, for example, in the downward direction. The bearing joints 18 and 19 are preferably constructed as conventional rubber joints. The wheel spring system (not illustrated), for example, in the form of coil springs, is supported preferably on the inclined guide members 16 and 17.

According to the present invention, the axle gear housing 20 together with the drive shaft 12 of the wheel 10 constitutes kinematically with respect to the spring movements of the wheel a swinging or pivot unit in the form of a swinging half-axle generally designated by reference numeral 21. The drive shaft 12 is for that purpose supported in an angle-rigid manner in the axle gear housing 20 which is also the case for the support of the drive shaft 12 in the inclined guide member 16 by means of the bearing 14. The swinging half-axle 21 and the axle gear housing 20 are further suspended at the vehicle superstructure 26, for instance, yieldingly or elastically by means of a longitudinally directed arm 22, for example, constructed as leaf spring, in a point 23, and by means of a transversely directed arm 24 in a point 25, the vehicle superstructure being constituted by the frame or the body, e.g., of a self-supporting type body construction, whereby the points 23 and 25 determine the pivot axis $y$—$y$ of the swinging half-axle 21 which extends obliquely toward the outside. The axes $y$—$y$ and $x$—$x$ thereby form an acute angle. The pivot axis $y$—$y$ of the swinging half-axle 21 is thereby so disposed that it intersects the bearing axis $x$—$x$, as seen in the plan view, in the vertical vehicle transverse plane $m$—$m$.

Figure 3:
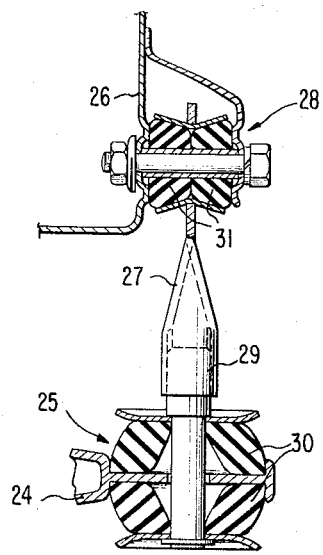
FIGURE 3 is a partial cross-sectional view on an enlarged scale, of the constructional details of the suspension guide element used in connection with the present invention at a bearing place of the axle gear housing.

The suspension in the point 25 takes place preferably by means of a vertical suspension guide member 27 which is pivotally connected at the vehicle superstructure 26 by a joint 28 whereby appropriately both the joint 25 as also the joint 28 are constructed as rubber joints whose details are illustrated in detail in FIGURE 3. The suspension guide member 27 is constructed so as to be adjustable in its length by means of threads 29 or the like (FIG. 3). The suspension guide member 27 is connected with the preferably rigid cross arm 24 by the interposition of rubber rings 30 having a vertical ring axis which are yielding especially in the horizontal direction, and with the vehicle superstructure 26 by means of rubber rings 31 having a horizontally extending ring axis so that the suspension guide member 27 is capable of adjusting itself in all directions into an inclined position.

The drive of the axle gear (not shown) accommodated within the axle gear housing 20 takes place, for example, from a forwardly disposed engine (not shown) by means of a Cardan shaft 32 while the distribution of the drive from the axle gear takes place, on the one hand, by way of the axle drive shaft 12 directly to the wheel 10 and, on the other, to the wheel 11 by way of a double-jointed shaft 33 which is connected by means of a conventional joint 34 with the axle gear and by means of a sliding joint 35 with the drive shaft 13 of the wheel 11.

If the wheels 10 and 11 undergo spring deflections, then they are guided by the inclined guide members 16 and 17 which pivot about the axes $x$—$x$ and $x_1$—$x_1$, respectively. The double-jointed shaft 33 of the wheel 11 can thereby follow the movements of the inclined guide member 17 without difficulty by reason of the two joints 34 and 35.

The wheel center point O of the wheel 10, in its turn, seeks to pivot, on the one hand, within a plane $e_1$ perpendicular to the bearing axis $x$—$x$ and, on the other, within a plane $e_2$ perpendicular to the pivot axis $y$—$y$. Since these two axes and therewith also the two planes $e_1$ and $e_2$ form with each other only a relatively acute angle and since the axes intersect in a point M or near such a point, the differences in movements can be absorbed without difficulties by the yieldingness of the arm 22 and of the suspension guide element 27 and/or by the rubber bearings 18 of the inclined guide member 16. The center point O of the wheel 10 will therefore carry out, depending on the selected yieldingnesses, a resulting pivot movement intermediate the two planes $e_1$ and $e_2$ whereby the resulting pivot plane is disposed, as a rule, closer to the plane $e_1$ than to the plane $e_2$.

While I have shown and described one embodiment in accordance with the present invention, it is understood that the same is not limited thereto but is susceptible of numerous changes and modifications as known to a person skilled in the art, and I therefore do not wish to be limited to the details shown and described herein, but intend to cover all such changes and modifications as are encompassed by the scope of the appended claims.

I claim:

1. A wheel suspension for the driven wheels of motor vehicles having a vehicle superstructure, comprising:
   inclined guide means for each wheel,
   bearing support means for supporting said inclined guide means at the vehicle superstructure about pivot axes disposed obliquely with respect to the vertical vehicle longitudinal center plane and with respect to the vertical vehicle transverse plane containing the centers of the wheels,
   swinging half-axle means for supporting one of the two wheels including drive shaft means for said one wheel,
   said swinging half-axle means being connected with the one inclined guide means associated therewith in at least a substantially angle-rigid manner,
   support means for supporting said swinging half-axle means at said vehicle superstructure in such a manner that the pivot axis of said swinging half-axle means intersects the pivot axis of the one inclined guide means at least near the vertical vehicle transverse plane containing the wheel centers,
   joint shaft means for driving the other wheel which is supported on the other inclined guide means,
   said support means for supporting said swinging half-axle means at the vehicle superstructure including a yielding longitudinal arm and a yielding cross arm and approximately vertical suspension guide means suspending said swinging half-axle means at the vehicle superstructure and means including elastic ring means having a substantially vertical ring axis connecting said suspension guide means with said cross arm and elastic ring means having a substantially horizontal axis connecting said suspension guide means at the vehicle superstructure.

2. A wheel suspension according to claim 1, and said suspension guide means being adjustable in its length.

3. A wheel suspension according to claim 1, wherein the pivot axes of the inclined guide means intersects the vertical vehicle transverse plane containing the wheel centers on the vehicle side opposite the respective wheel with respect to the vehicle longitudinal center plane.

4. A wheel suspension according to claim 1, wherein the pivot axis of said swinging half-axle means extends obliquely to the vehicle longitudinal direction in such a manner that the angle subtended between the pivot axis of said one inclined guide means and the pivot axis of said swinging half-axle means is reduced in comparison to the angle between the pivot axis of said one inclined guide means and a longitudinally extending axis.

5. A wheel suspension for the driven wheels of motor vehicles having a vehicle superstructure, comprising:
   inclined guide means for each wheel,
   bearing support means for supporting said inclined guide means at the vehicle superstructure about pivot axes disposed obliquely with respect to the vertical vehicle longitudinal center plane and with respect to the vertical vehicle transverse plane containing the centers of the wheels, swinging half-axle means for supporting one of the two wheels including drive shaft means for said one wheel, said swinging half-axle means being connected with the one inclined guide means associated therewith in at least a substantially angle-rigid manner, support means for supporting said swinging half-axle means at said vehicle superstructure in such a manner that the pivot axes of said swinging half-axle means intersects the pivot axis of said one inclined guide means at least near the vertical vehicle transverse plane containing the wheel centers, and joint shaft means for driving the other wheel which is supported on the other inclined guide means, said swinging half-axle means essentially consisting of an axle gear housing means pivotally supported at the vehicle superstructure and of the drive shaft means rigidly connected with said one wheel and supported in said axle gear housing means and in said one inclined guide means, said support means supporting the axle gear housing means of said swinging half-axle means at the vehicle superstructure and including a yielding longitudinal arm and a yielding cross arm and approximately vertical suspension guide means including elastic cushion means suspending the axle gear housing means of said swinging half-axle means at the vehicle superstructure by way of one of said arms.

6. A wheel suspension according to claim 5, said elastic means including elastic ring means having a substantially vertical ring axis connecting said suspension guide means with said one arm and elastic ring means having a substantially horizontal axis connecting said suspension guide means at the vehicle superstructure.

7. A wheel suspension according to claim 6, and said suspension guide means being adjustable in its length.

8. A wheel suspension according to claim 5, wherein said longitudinal arm is directly pivoted to said vehicle superstructure.

9. A wheel suspension according to claim 5, wherein the pivot axes of the inclined guide means intersects the vertical vehicle transverse plane containing the wheel centers on the vehicle side opposite the respective wheel with respect to the vehicle longitudinal center plane.

10. The wheel suspension according to claim 5, wherein the pivot axis of said swinging half-axle means extends obliquely to the vehicle longitudinal direction in such a manner that the angle subtended between the pivot axis of said one inclined guide means and the pivot axis of said swinging half axle means is reduced in comparison to the angle between the pivot axis of said one inclined guide means and a longitudinally extending axis.

11. A wheel suspension for the driven wheels of motor vehicles having a vehicle superstructure, comprising:
inclined guide means for each wheel,
bearing support means for supporting said inclined guide means at the vehicle superstructure about pivot axis disposed obliquely with respect to the vertical longitudinal center plane and with respect to the vertical vehicle transverse plane containing the centers of the wheels,
swinging half-axle means for supporting one of the two wheels including drive shaft means for said one wheel,
said swinging half-axle means being connected with the one inclined guide means associated therewith in at least a substantially angle-rigid manner,
support means for supporting said swinging half-axle means at said vehicle superstructure in such a manner that the pivot axis of said swinging half-axle means intersects the pivot axis of said one inclined guide means at least near the vertical vehicle transverse plane containing the wheel centers,
and joint shaft means for driving the other wheel which is supported on the other inclined guide means,
the pivot axis of said swinging half-axle means extending obliquely to the vehicle longitudinal direction in such a manner that the angle subtended between the pivot axis of said one inclined guide means and the pivot axis of said swinging half-axle means is reduced in comparison to the angle between the pivot axis of said one inclined guide means and a longitudinally extending axis,
said support means including elastic means for compensating for differences in movements between the pivot movements of said one guide means, on the one hand, and of the swinging half-axle means, on the other,
said bearing support means supporting said one inclined guide means at the vehicle superstructure including elastic means for compensating for differences in movements between the pivot movements of said one guide means on the one hand, and of said swinging half-axle means, on the other,
said support means for supporting said swinging half-axle means at the vehicle superstructure including a yielding longitudinal arm and a yielding cross arm, and approximately vertical suspension guide means including rubber cushion means suspending said swinging half-axle means at the vehicle superstructure by way of one of said arms.

12. A wheel suspension for the driven wheels of motor vehicles having a vehicle superstructure, comprising:
inclined guide means for each wheel,
bearing support means for supporting said inclined guide means at the vehicle superstructure about pivot axes disposed obliquely with respect to the vertical vehicle longitudinal center plane and with respect to the vertical vehicle transverse plane containing the centers of the wheels,
swinging half-axle means for one of the two wheels including drive shaft means for said one wheel,
said swinging half-axle means being connected with the one inclined guide means coordinated to said one wheels in at least a substantially angle-rigid manner,
support means for supporting said swinging half-axle means at said vehicle superstructure in such a manner that the pivot axis of said swinging half-axle means intersects the pivot axis of the associated one inclined guide means at least near the vertical vehicle transverse plane containing the wheel centers,
and joint shaft means for driving the other wheel which is supported on the other inclined guide means,
the pivot axes of the inclined guide means intersecting the vertical vehicle transverse plane containing the wheel centers on the vehicle side opposite the respective wheel with respect to the vehicle longitudinal center plane,
the pivot axis of said swinging half-axle means extending obliquely to the vehicle longitudinal direction in such a manner that the angle subtended between the pivot axis of said one inclined guide means and the pivot axis of said swinging half-axle means is reduced in comparison to the angle between the pivot axis of said one inclined guide means and a longitudinally extending axis,
and means for compensating for differences in movements between the pivot movements of said one guide means, on the one hand, and the swinging half-axle means on the other, including elastic means in said support means elastically supporting said swinging half-axle means at the vehicle superstructure, and elastic means in the bearing support means for said one guide means for elastically supporting said one inclined guide means at the vehicle superstructure, said swinging half-axle means essentially consisting of an axle gear housing means pivotally supported at the vehicle superstructure and of the drive shaft means rigidly connected with said one wheel and supported in said axle gear housing means and in said one inclined guide means, said support means supporting the axle gear housing means at the vehicle superstructure and including a yielding longitudinal arm, a yielding cross arm, approximately vertical suspension guide means including rubber cushion means suspending said swinging half-axle means at the vehicle superstructure by way of one of said arms, elastic annular cushion means having a substantially vertical axis connecting said suspension guide means with said one arm, and elastic annular cushion means having a substantially horizontal axis connecting said suspension guide means at the vehicle superstructure, and said suspension guide means being adjustable in its length.

13. A wheel suspension for the driven wheels of motor vehicles having a vehicle superstructure, comprising:

inclined guide means for each wheel, bearing support means for supporting said inclined guide means at the vehicle superstructure about pivot axes disposed obliquely with respect to the vertical vehicle longitudinal center plane and with respect to the vertical vehicle transverse plane containing the centers of the wheels, swinging half-axle means for supporting one of the two wheels including drive shaft means for said one wheel, said swinging half-axle means being connected with the one inclined guide means associated therewith in at least a substantially angle-rigid manner, support means for supporting said swinging half-axle means at said vehicle superstructure in such a manner that the pivot axis of said swinging half-axle means intersects the pivot axis of the one inclined guide means at least near the vertical vehicle transverse plane containing the wheel centers, joint shaft means for driving the other wheel which is supported on the other inclined guide means, said support means for supporting said swinging half-axle means at the vehicle superstructure including a yielding longitudinal arm and a yielding cross arm and approximately vertical suspension guide means suspending said swinging half-axle means at the vehicle superstructure and means connecting said suspension guide means at one end with said cross arm for movement relative thereto in one direction and means connecting said suspension guide means at an opposite end to the vehicle superstructure for movement relative thereto in a direction substantially perpendicular to said first mentioned direction.

14. The wheel suspension system according to claim 13, wherein said suspension guide means includes means for manually adjusting its effective length.

References Cited

UNITED STATES PATENTS

| | | | |
|---|---|---|---|
| 2,806,714 | 9/1957 | Scherenberg et al. | 180—73 X |
| 3,220,502 | 11/1965 | Muller | 180—73 |
| 3,243,008 | 3/1966 | Muller | 180—73 |

A. HARRY LEVY, *Primary Examiner.*